United States Patent
Li et al.

(10) Patent No.: US 11,674,007 B2
(45) Date of Patent: Jun. 13, 2023

(54) MODIFIED COLLAGEN FIBER, AND PREPARATION METHOD AND APPLICATION

(71) Applicant: SICHUAN UNIVERSITY, Chengdu (CN)

(72) Inventors: Shuangyang Li, Zhoukou (CN); Bi Shi, Chengdu (CN); Jianfei Zhou, Chengdu (CN); Weixing Xu, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 17/739,080

(22) Filed: May 7, 2022

(65) Prior Publication Data
US 2022/0259389 A1 Aug. 18, 2022

Related U.S. Application Data

(63) Continuation of application No. PCT/CN2021/109599, filed on Jul. 30, 2021.

(51) Int. Cl.
| | | |
|---|---|---|
| C08J 5/04 | (2006.01) | |
| C08J 5/12 | (2006.01) | |
| B29C 71/02 | (2006.01) | |
| C08L 75/04 | (2006.01) | |

(52) U.S. Cl.
CPC ............. *C08J 5/045* (2013.01); *C08J 5/121* (2013.01); *C08J 7/08* (2013.01); *C08L 75/04* (2013.01); *C08J 2375/04* (2013.01); *C08J 2389/04* (2013.01); *C08L 2205/16* (2013.01)

(58) Field of Classification Search
None
See application file for complete search history.

(56) References Cited

U.S. PATENT DOCUMENTS

2013/0239340 A1* 9/2013 Reineking ................. C14C 3/04
544/212

FOREIGN PATENT DOCUMENTS

| CN | 1410157 A | 4/2003 |
|---|---|---|
| CN | 101235423 A | 8/2008 |
| CN | 101294349 A | 10/2008 |
| CN | 102443184 A | 5/2012 |
| CN | 102977390 A | 3/2013 |
| CN | 103147344 A | 6/2013 |
| CN | 105102711 A | 11/2015 |
| CN | 105921132 A | 9/2016 |
| CN | 108997739 A | 12/2018 |
| CN | 109206643 A | 1/2019 |
| CN | 109880945 * | 6/2019 |
| CN | 110479216 A | 11/2019 |
| CN | 112064346 A | 12/2020 |
| EP | 0439866 A1 | 8/1991 |
| WO | 2014132889 A1 | 9/2014 |
| WO | WO 2016/182418 * | 11/2016 |

OTHER PUBLICATIONS

Machine translation of CN 109206643 (Year: 2019).*
Machine translation of Jinwei et al. (CN 109880945). (Year: 2019).*
Machine translation of Diez Perez et al. (WO 2016/182418) (Year: 2016).*
ASTM D412-98a, Standard Test Methods for Vulcanized Rubber and Thermoplastic Elastomers-Tension, ASTM International, 2002, pp. 1-14.
QB/T 1811-1993, Test methods for permeability to water vapor of leather, Ministry of Light Industry of PRC, 1993.
ASTM D2863-77, Standard Test Method for Measuring the Minimum Oxygen Concentration to Support Candle-Like Combustion of Plastics (Oxygen Index), 1977, pp. 1-13.

* cited by examiner

*Primary Examiner* — Robert T Butcher
(74) *Attorney, Agent, or Firm* — Bayramoglu Law Offices L.L.C

(57) ABSTRACT

A modified collagen fiber preparation method and application are provided. The modified collagen fiber is prepared by modifying a collagen fiber with a plant tannin; and a method of the preparation includes: mixing the plant tannin with the collagen fiber in a liquid environment with a pH of 5 to 8 to allow a reaction, and washing and drying a product. In the present disclosure, a plant tannin rich in phenolic hydroxyl can be combined with a collagen fiber in various ways such as multi-point hydrogen bonding and hydrophobic bonding, such that the plant tannin structure is introduced into a natural multi-layer micro/nano-structure of the collagen fiber; and due to a large number of phenolic hydroxyl structures in the plant tannin, the collagen fiber introduced with the plant tannin structure shows improved compatibility with a waterborne resin, and can produce strong hydrogen bonding with polar groups in the waterborne resin.

28 Claims, No Drawings

MODIFIED COLLAGEN FIBER, AND PREPARATION METHOD AND APPLICATION

CROSS REFERENCE TO THE RELATED APPLICATIONS

This application is a continuation application of the national phase entry of International Application No. PCT/CN2021/109599, filed on Jul. 30, 2021, which is based upon and claims priority to Chinese Patent Application No. 202010985238.X, filed on Sep. 18, 2020, the entire contents of which are incorporated herein by reference.

TECHNICAL FIELD

The present disclosure relates to the technical field of functional composite materials, and in particular to a modified collagen fiber and application thereof.

BACKGROUND

The materials prepared from waterborne resins have poor water vapor permeability, and are prone to yellowing and degradation when exposed to light, which results in a decrease in their mechanical properties and thermal stability and limits their applications. In order to improve the mechanical properties, thermal stability, water vapor permeability, and aging resistance of waterborne resins, different functional fillers can be added therein to prepare composite materials. Fillers such as graphene, carbon nanotubes (CNTs), montmorillonite, kaolin, nano-silicon dioxide, cellulose, lignin, and dopamine can improve the mechanical properties and thermal stability of waterborne resins.

However, restricted by factors such as development cost, preparation process, and product performance, it is still extremely challenging to simultaneously improve the above-mentioned properties of composite materials.

In view of this, the present disclosure is specifically proposed.

SUMMARY

A first objective of the present disclosure is to provide a modified collagen fiber, which can be used to modify a waterborne resin and can simultaneously improve the mechanical properties, water vapor permeability, aging resistance, and flame resistance of the waterborne resin.

A second objective of the present disclosure is to provide application of modified collagen fiber, that is, a waterborne resin composite material and a preparation method thereof. The waterborne resin composite material has excellent mechanical properties, water vapor permeability, aging resistance, and flame resistance.

To achieve the above objectives, the present disclosure adopts the following technical solutions:

A modified collagen fiber is provided, where the modified collagen fiber is prepared by modifying a collagen fiber with a plant tannin; and a method for the preparation specifically includes the following steps:

mixing the plant tannin with the collagen fiber in a liquid environment with a pH of 5 to 8 to allow a reaction, and washing and drying a product.

In a preferred embodiment of the present disclosure, the plant tannin may be mixed with the collagen fiber in a liquid environment with a pH of 6.5 to 7 to allow a reaction, and then a product may be washed and dried.

The plant tannin is allowed to pre-react with the leather collagen fiber (LCF), where the rich phenolic hydroxyl in the plant tannin can be combined with the LCF in various ways such as multi-point hydrogen bonding and hydrophobic bonding, such that the plant tannin structure is introduced into a natural multiscale micro/nano-structure of the LCF.

A reaction between the plant tannin and the collagen fiber is as follows: the plant tannin first approaches the collagen fiber by hydrophobic bonding, and then the phenolic hydroxyl in the tannin structure undergoes multi-point hydrogen bonding with a peptide chain, hydroxyl, amino, and carboxyl in the collagen fiber structure.

The natural multi-layer micro/nano-structure of LCF itself has a prominent toughening effect, and LCF shows hydrophilicity and excellent water vapor permeability to some degree. The collagen fiber introduced with the plant tannin structure can produce strong hydrogen bonding with polar groups in a waterborne resin due to the large number of phenolic hydroxyl structures in the plant tannin. In addition, the phenolic hydroxyl can also capture free radicals, which can help improve the aging resistance of a material.

For example, in different embodiments, the pH of the liquid environment may be 6.5, 6.6, 6.7, 6.8, 6.9, 7.0, and the like. A pH in the above range can effectively promote the effective combination of a plant tannin with a collagen fiber. In the present disclosure, a plant tannin is allowed to react with a collagen fiber at a pH of 5 to 8, where the rich phenolic hydroxyl groups in the plant tannin undergo multi-point hydrogen bonding with a peptide chain, hydroxyl, amino, and carboxyl in the collagen fiber structure, such that the plant tannin is combined with the collagen fiber through various ways such as multi-point hydrogen bonding and hydrophobic bonding. The various bonding ways are superimposed and synergistically transformed into strong bonding, which can ensure the stable combination of the tannin structure and the collagen fiber without the introduction of a cross-linking agent. Therefore, the technical effect of the present disclosure can be achieved without the need to add a cross-linking agent.

In a specific embodiment of the present disclosure, plant tannin may be a condensed tannin or a mixed tannin. Preferably, the plant tannin may include any one or more from the group consisting of bayberry tannin, black wattle tannin, larch tannin, *quebracho* tannin, and *Acacia mangium* (*A. mangium*) tannin; and more preferably, the plant tannin may be bayberry tannin.

In a specific embodiment of the present disclosure, a mass ratio of the plant tannin to the collagen fiber may be 1:(1-10), preferably 1:(2-5), and more preferably 1:(3-4).

For example, in different embodiments, the mass ratio of the plant tannin to the collagen fiber may be 1:1, 1:2, 1:3, 1:4, 1:5, 1:6, 1:7, 1:8, 1:9, 1:10, and the like.

In a specific embodiment of the present disclosure, the reaction may be conducted for 1 hour to 10 hours, preferably 2 hours to 8 hours, and preferably 4 hours to 6 hours, which may be conducted for 5 hours, for example. Further, the reaction may be conducted under stirring. In practice, conventional mechanical stirring may be adopted, and the reaction may be conducted at room temperature.

In a specific embodiment of the present disclosure, mixing the plant tannin with the collagen fiber in the liquid environment with a pH of 6.5 to 7 to allow a reaction may include:

mixing an aqueous solution of the plant tannin and an aqueous dispersion of the collagen fiber, and adjusting a pH to 6.5 to 7 with an alkali to allow the reaction.

In a preferred embodiment of the present disclosure, the aqueous solution of the plant tannin may be added to the aqueous dispersion of the collagen fiber for mixing.

In a specific embodiment of the present disclosure, the alkali may include any one or more from the group consisting of sodium bicarbonate, sodium hydroxide, sodium carbonate, ammonia water, and ammonium bicarbonate.

In practice, the alkali may be added in the form of an aqueous solution thereof, and a concentration of the aqueous solution of the alkali can be adjusted according to actual needs, which can be 0.05 mol/L to 0.2 mol/L and further can be 0.1 mol/L, for example.

In a specific embodiment of the present disclosure, in the aqueous solution of the plant tannin, a mass fraction of the plant tannin may be 10% to 20% and preferably 15% to 18%.

For example, in different embodiments, in the aqueous solution of the plant tannin, the mass fraction of the plant tannin may be 10%, 11%, 12%, 13%, 14%, 15%, 16%, 17%, 18%, 19%, 20%, and the like. In practice, the plant tannin may be added to water such as deionized water, and a resulting mixture may be stirred until the plant tannin is completely dissolved to obtain the aqueous solution of the plant tannin.

In a specific embodiment of the present disclosure, in the aqueous dispersion of the collagen fiber, a mass ratio of the collagen fiber to water may be 1:(40-60) and preferably 1:(45-55), which may be 1:50, for example.

For example, in different embodiments, in the aqueous dispersion of the collagen fiber, the mass ratio of the collagen fiber to the water may be 1:40, 1:41, 1:42, 1:43, 1:44, 1:45, 1:46, 1:47, 1:48, 1:49, 1:50, and the like. The collagen fiber may be mixed with deionized water and a resulting mixture may be stirred until the collagen fiber is uniformly dispersed in the deionized water to obtain the aqueous dispersion of the collagen fiber.

In a specific embodiment of the present disclosure, the washing may include: subjecting a material obtained after the reaction to solid-liquid separation (SLS), collecting a resulting solid, and washing the solid with ethanol. Further, the washing may be repeated 1 to 3 times. The solid is washed with ethanol to remove the unreacted plant tannin.

In a specific embodiment of the present disclosure, the drying may be conducted as follows: drying at 30° C. to 90° C. for 16 hours to 30 hours by any one from natural air-curing, heat-drying, and vacuum-drying; preferably, drying at 60° C. to 85° C. for 18 hours to 26 hours by heat-drying or vacuum-drying; and more preferably, drying at 80±2° C. for 24±2 hours by heat-drying or vacuum-drying.

In a preferred embodiment of the present disclosure, the collagen fiber may be mainly prepared through pretreatment of leather shavings.

The leather shavings are widely available, and thus the use of the leather shavings as a raw material can realize the comprehensive utilization of leather-making solid waste while reducing a material costs.

Further, the leather shavings may include metal-tanned leather shavings. The leather shavings may include blue leather shavings.

In a specific embodiment of the present disclosure, the pretreatment may include: dewatering and crushing the leather shavings. Further, the pretreatment may include: washing the leather shavings with water, adjusting a pH, washing with water, soaking in ethanol, filtering, drying, and crushing.

In practice, a method of the dewatering may include any one or more from natural air-curing, heat-drying, ethanol dewatering, lyophilization, and vacuum-drying.

In a preferred embodiment of the present disclosure, the crushed collagen fiber may have a particle size of 40 to 500 mesh and preferably 40 to 100 mesh.

In a specific embodiment of the present disclosure, the crushing may be conducted by a crusher, and a type of the crusher can be adjusted according to actual needs.

The present disclosure also provides a modified waterborne resin composite material, including the modified collagen fiber described above and a waterborne resin.

In a specific embodiment of the present disclosure, the waterborne resin may include any one or more from the group consisting of a waterborne polyurethane (WPU) resin, a waterborne polyester resin, and a waterborne acrylic resin; and more preferably, the waterborne resin may be a WPU resin.

The modified waterborne resin composite material of the present disclosure is obtained by mixing a plant tannin (such as a plant condensed tannin)-modified collagen fiber with a waterborne resin, where due to a large number of phenolic hydroxyl structures in the plant tannin, the collagen fiber can produce strong hydrogen bonding with polar groups in the waterborne resin, with a strong bonding force. When the modified collagen fiber is mixed with the waterborne resin, the interfacial compatibility of the two can be improved, such that a stress can be effectively transferred at an interface between the waterborne resin and the modified collagen fiber, and the mechanical properties such as tensile strength of the modified waterborne resin can be improved.

A collagen fiber modified with a plant tannin such as a plant condensed tannin has prominent water vapor permeability and surface hydrophilicity, and as mentioned above, a condensed tannin-modified collagen fiber shows excellent interfacial compatibility with a waterborne resin and can be uniformly dispersed in the waterborne resin, such that a continuous water and gas permeable passage is formed in a composite material to significantly improve the water vapor permeability of the composite material. In the present disclosure, the large number of phenolic hydroxyl structures in the tannin can produce strong hydrogen bonding with polar groups in the waterborne resin to improve the interfacial compatibility between the modified collagen fiber and the waterborne resin and improve the mechanical properties and water vapor permeability; the phenolic hydroxyl can capture free radicals to improve the aging resistance of a material; the plant tannin is not easy to burn, and thus can improve the flame resistance of the composite material when uniformly distributed in the waterborne resin.

After WPU itself is exposed to light for a long time, C—O or C—N bonds in urethane groups in a molecular chain are broken to form amino radicals and alkoxy radicals, such that the aging resistance of the WPU becomes poor. Therefore, the WPU is easy to degrade under long-term light exposure, which seriously affects its normal use in outdoor and other working scenarios. In the modified WPU composite material of the present disclosure, the plant tannin-modified collagen fiber can effectively alleviate a degradation rate of the WPU and prolong the normal service time of the composite material. This is because a chemical structure of the condensed tannin such as bayberry tannin includes a large number of phenolic hydroxyl groups, which can capture free radicals and play a role in delaying oxidation.

In addition, the collagen fiber structure has a relatively high nitrogen content, and flame-retardant nitrogen-containing compounds generated during a high-temperature decomposition process can dilute a combustion gas concentration near a flame, thereby playing a flame-retardant role. Moreover, the multi-layer structure of the collagen fiber enables the tight packing of fibers, and a porous carbon layer is formed after combustion to prevent heat transfer and mass loss. In addition, the plant tannin is not easy to burn and has prominent self-extinguishing performance, which further improves the flame resistance of the composite material.

In a preferred embodiment of the present disclosure, a mass ratio of the modified collagen fiber to the waterborne resin may be 1:(1-5), preferably 1:(1.5-4), and more preferably 1:(2-3).

For example, in different embodiments, the mass ratio of the modified collagen fiber to the waterborne resin may be 1:1, 1:1.5, 1:2, 1:2.5, 1:3, 1:3.5, 1:4, 1:4.5, 1:5, and the like.

The mass ratio of the modified collagen fiber to the waterborne resin such as WPU can be adjusted within the above range to make an obtained modified waterborne resin composite material have excellent mechanical strength, water vapor permeability, aging resistance, and flame resistance.

The present disclosure also provides a preparation method of the modified waterborne resin composite material described above, including the following steps:

blending the modified collagen fiber and the waterborne resin, and molding a resulting mixture.

In a specific embodiment of the present disclosure, the blending may be conducted as follows: stirring a mixture of the modified collagen fiber and the waterborne resin for 30 min to 40 min at room temperature and a stirring rate of 500 r/min to 3,000 r/min.

In a specific embodiment of the present disclosure, the molding may be conducted as follows: placing a blended material in a mold, and drying at 90° C. to 110° C. Further, the drying may be conducted at 90° C. to 120° C.

In practice, the molding may be conducted by a hand laying-up technique. Further, the molding may be conducted as follows: using a hand laying-up technique to coat a blended material on a surface of a base cloth or release paper with a roll coater, and drying at 90° C. to 120° C.

Further, a time of the drying can be adjusted according to actual needs, as long as the material is allowed to be dry at the above temperature. A dry material means that a moisture content in the material is <5%.

In the present disclosure, a collagen fiber with a tannin structure is introduced, and a large number of phenolic hydroxyl structures in the tannin can produce strong hydrogen bonding with the repeating group —NHCOO— in a waterborne resin such as WPU, which greatly improves the interfacial compatibility between the collagen fiber and the WPU to significantly improve the mechanical properties, water vapor permeability, aging resistance, and flame resistance. Compared with a composite material with an unmodified collagen fiber, the composite material of the present disclosure shows significantly improved tensile strength, water vapor permeability, tensile strength before and after light exposure, and aging resistance. The present disclosure can also achieve the aforementioned effect without adding a cross-linking agent. When a pH of the modified collagen fiber is adjusted to 6.5 to 7, a resulting composite material shows the optimal performance.

Compared with the prior art, the present disclosure has the following beneficial effects.

(1) In the present disclosure, a plant condensed or mixed tannin rich in phenolic hydroxyl can be combined with a collagen fiber in various ways such as multi-point hydrogen bonding and hydrophobic bonding, such that the plant tannin structure is introduced into a natural multi-layer micro/nano-structure of the collagen fiber; and due to a large number of phenolic hydroxyl structures in the tannin, the collagen fiber introduced with the tannin structure can produce strong hydrogen bonding with the repeating group —NHCOO— in WPU, which greatly improves the interfacial compatibility between the collagen fiber and WPU.

(2) When the tannin, the collagen fiber, and the WPU have an appropriate mass ratio, the modified WPU composite material obtained by mixing the modified collagen fiber and the WPU according to the present disclosure shows significantly-improved mechanical properties, water vapor permeability, aging resistance, and flame resistance.

DETAILED DESCRIPTION OF THE EMBODIMENTS

Technical solutions of the present disclosure will be clearly and completely described below with reference to specific implementations. However, those skilled in the art will understand that the examples described below are merely some rather than all of the examples of the present disclosure, and the examples are only used to illustrate the present disclosure and should not be regarded as limiting the scope of the present disclosure. All other examples obtained by a person of ordinary skill in the art based on the examples of the present disclosure without creative efforts shall fall within the protection scope of the present disclosure. If no specific conditions are specified in the examples, the examples will be conducted according to conventional conditions or the conditions recommended by the manufacturer. All of the used reagents or instruments which are not specified with manufacturers are conventional commercially-available products.

Some material information used in the specific examples of the present disclosure may be as follows:

blue leather shavings: which come from the waste of a tannery; and

WPU: which has a model of KT702E, and comes from Hefei Scisky Technology Co., Ltd. However, it is not limited to this.

The collagen fibers used in the following specific examples can be prepared from the blue leather shavings (but not limited to this), and a specific preparation method can be as follows:

the blue leather shavings are added to deionized water, a pH is adjusted to 6 with a 1 mol/L sodium bicarbonate aqueous solution, and the blue leather shavings are filtered out and dewatered with ethanol; and after ethanol volatilizes, the blue leather shavings are ground with an ultracentrifugal crusher equipped with a cooler or diffuser, and then sieved through a 40-mesh sieve to obtain the collagen fiber.

EXAMPLE 1

A preparation method of a modified collagen fiber was provided in this example, including the following steps:

(1) 1 kg of bayberry tannin was taken and added to 5 kg of deionized water, and a resulting mixture was stirred until the bayberry tannin was completely dissolved to obtain an aqueous solution of the bayberry tannin for later use.

3 kg of a collagen fiber was taken and added to a container, then 150 kg of deionized water was added, and a resulting mixture was stirred such that the collagen fiber was uniformly dispersed in the deionized water to obtain an aqueous dispersion of the collagen fiber. A mass ratio of the tannin to the collagen fiber was 1:3.

(2) The aqueous solution of the bayberry tannin prepared in step (1) was added to the aqueous dispersion of the collagen fiber prepared in step (1) to obtain a mixed material; then a pH of the mixed material was adjusted to 6.5 to 7 and maintained stable using a 0.1 mol/L sodium bicarbonate aqueous solution, and the mixed material was mechanically stirred for 5 hours and then filtered through a Buchner funnel; a resulting solid material was washed 3 times with absolute ethanol to remove the unreacted bayberry tannin; and then the solid material was dried at 80±2° C. for 24 hours to obtain a bayberry tannin-modified collagen fiber (BT-LCF).

EXAMPLE 2

A preparation method of a modified collagen fiber was provided in this example, which was different from that in Example 1 in that:

a pH of the mixed material obtained in step (2) was adjusted to 5 and maintained stable using a 0.1 mol/L sodium bicarbonate aqueous solution.

EXAMPLE 3

A preparation method of a modified collagen fiber was provided in this example, which was different from that in Example 1 in that:

a pH of the mixed material obtained in step (2) was adjusted to 6 and maintained stable using a 0.1 mol/L sodium bicarbonate aqueous solution.

EXAMPLE 4

A preparation method of a modified collagen fiber was provided in this example, which was different from that in Example 1 in that:

a pH of the mixed material obtained in step (2) was adjusted to 8 and maintained stable using a 0.1 mol/L sodium bicarbonate aqueous solution.

EXAMPLE 5

A preparation method of a modified collagen fiber was provided in this example, which was different from that in Example 1 in that:

in step (1), 3 kg of bayberry tannin was taken and added to 15 kg of deionized water, and a resulting mixture was stirred until the bayberry tannin was completely dissolved to obtain an aqueous solution of the bayberry tannin for later use; and 3 kg of a collagen fiber was taken and added to a container, then 150 kg of deionized water was added, and a resulting mixture was stirred such that the collagen fiber was uniformly dispersed in the deionized water to obtain an aqueous dispersion of the collagen fiber. A mass ratio of the bayberry tannin to the collagen fiber was 1:1.

EXAMPLE 6

A preparation method of a modified collagen fiber was provided in this example, which was different from that in Example 1 in that:

in step (1), 0.3 kg of bayberry tannin was taken and added to 1.5 kg of deionized water, and a resulting mixture was stirred until the bayberry tannin was completely dissolved to obtain an aqueous solution of the bayberry tannin for later use; and 3 kg of a collagen fiber was taken and added to a container, then 150 kg of deionized water was added, and a resulting mixture was stirred such that the collagen fiber was uniformly dispersed in the deionized water to obtain an aqueous dispersion of the collagen fiber. A mass ratio of the bayberry tannin to the collagen fiber was 1:10.

EXAMPLE 7

A preparation method of a modified collagen fiber was provided in this example, which was different from that in Example 1 in that:

The black wattle tannin was used instead of the bayberry tannin at an equal amount.

EXAMPLES 8 TO 15

Different modified WPU composite materials and preparation methods thereof were provided in Examples 8 to 15. The compositions of the modified WPU composite materials are shown in Table 1 below.

TABLE 1

| Compositions of different modified WPU composite materials | | |
|---|---|---|
| Example No. | Modified collagen fiber (BT-LCF) | WPU |
| Example 8 | Example 1<br>3 kg | WPU<br>KT702 E<br>6 kg |
| Example 9 | Example 2<br>3 kg | WPU<br>KT702 E<br>6 kg |
| Example 10 | Example 3<br>3 kg | WPU<br>KT702 E<br>6 kg |
| Example 11 | Example 4<br>3 kg | WPU<br>KT702 E<br>6 kg |
| Example 12 | Example 5<br>3 kg | WPU<br>KT702 E<br>6 kg |
| Example 13 | Example 6<br>3 kg | WPU<br>KT702 E<br>6 kg |
| Example 14 | Example 7<br>3 kg | WPU<br>KT702 E<br>6 kg |
| Example 15 | Example 1<br>3 kg | WPU<br>KT702 E<br>9 kg |
| Example 16 | Example 1<br>3 kg | WPU<br>KT702 E<br>12 kg |

The preparation methods of the modified WPU composite materials of Examples 8 to 16 included the following steps:

a modified collagen fiber and WPU were mixed according to the above ratio, and a resulting mixture was stirred for 30 min at room temperature and a stirring rate of 1,000 r/min, poured into a polytetrafluoroethylene (PTFE) mold, dried in an oven at 100±3° C., and taken out to obtain a modified WPU composite material (WPU/BT-LCF).

COMPARATIVE EXAMPLE 1

WPU KT702E was prepared with reference to the preparation methods of Examples 8 to 16, without the addition of a modified collagen fiber.

COMPARATIVE EXAMPLE 2

A material in Comparative Example 2 was prepared with reference to the preparation method of Example 15, except that an unmodified collagen fiber was used instead of the modified collagen fiber of Example 1 at an equal amount.

COMPARATIVE EXAMPLE 3

A material in Comparative Example 3 was prepared with reference to the preparation method of Example 1, except that a pH of the mixed material obtained in step (2) was adjusted to 4 and maintained stable using a 0.1 mol/L sodium bicarbonate aqueous solution.

COMPARATIVE EXAMPLE 4

A material in Comparative Example 4 was prepared with reference to the preparation method of Example 8, except that when the modified collagen fiber and the WPU were mixed according to the ratio in Example 8, 180 g of an aziridine cross-linking agent (3% of a mass of the WPU) was added.

EXPERIMENTAL EXAMPLE 1

In order to compare and illustrate the tensile strength of the modified WPU composite materials of the examples and comparative examples of the present disclosure, the tensile properties of the materials of Examples 8 to 16 and Comparative Examples 1 to 4 were tested with reference to the ASTM D412 standard, and test results are shown in Table 2.

TABLE 2

Tensile strength test results of different WPU materials

| Example No. | Tensile strength/Mpa |
|---|---|
| Example 8 | 8.34 |
| Example 9 | 5.35 |
| Example 10 | 6.87 |
| Example 11 | 7.52 |
| Example 12 | 5.17 |
| Example 13 | 4.59 |
| Example 14 | 7.91 |
| Example 15 | 7.20 |
| Example 16 | 6.95 |
| Comparative Example 1 | 4.28 |
| Comparative Example 2 | 5.01 |
| Comparative Example 3 | 3.69 |
| Comparative Example 4 | 2.56 |

EXPERIMENTAL EXAMPLE 2

In order to compare and illustrate the water vapor permeability of the modified WPU composite materials of the examples and comparative examples of the present disclosure, the water vapor permeability of the materials of Examples 8 to 16 and Comparative Examples 1 to 4 was tested with reference to the QBT1811-1993 standard, and test results are shown in Table 3.

TABLE 3

Water vapor permeability test results of different WPU materials

| Example No. | Water vapor permeability (mg/(cm² h)) |
|---|---|
| Example 8 | 5457 |
| Example 9 | 4580 |
| Example 10 | 4729 |
| Example 11 | 5025 |
| Example 12 | 4490 |
| Example 13 | 3313 |
| Example 14 | 4956 |
| Example 15 | 4682 |
| Example 16 | 3502 |
| Comparative Example 1 | 957 |
| Comparative Example 2 | 3511 |
| Comparative Example 3 | 2869 |
| Comparative Example 4 | 2390 |

EXPERIMENTAL EXAMPLE 3

In order to compare and illustrate the aging resistance of the modified WPU composite materials of the examples and comparative examples of the present disclosure, the aging resistance of the materials of Examples 8 to 16 and Comparative Examples 1 to 4 was tested, and test results are shown in Table 4.

A specific test method is as follows: a material obtained in each of Examples 8 to 16 and Comparative Examples 1 to 4 was cut into dumbbell-shaped stripes, and the dumbbell-shaped stripes were divided into two groups; and one group was placed in a yellowing-resistance tester and irradiated for 72 hours under simulated fluorescent light, and the other group was used as a control sample and placed in a dark place without light for 72 hours. Parameters of the yellowing-resistance tester were set as follows: a power of a bulb: 300 W; a wavelength of a light source: 280 nm to 400 nm; an intensity of ultraviolet (UV) rays: 25±0.4 W/m²; a rotational speed of a sample tray: 3±1 r/min; a distance of a bottom edge of the bulb to the tray: 250±2 mm; and a temperature inside a box: 50±2° C. Then, the tensile strength and elongation at break were measured according to the ASTM D412 standard. Each sample was measured five times, and then an average value was taken.

TABLE 4

Aging resistance test results of different WPU materials

| Example No. | Tensile strength before light exposure/Mpa | Tensile strength after light exposure/Mpa |
|---|---|---|
| Example 8 | 8.34 | 8.11 |
| Example 9 | 5.35 | 4.75 |
| Example 10 | 6.87 | 5.97 |
| Example 11 | 7.52 | 7.24 |
| Example 12 | 5.17 | 4.53 |
| Example 13 | 4.59 | 4.16 |
| Example 14 | 7.91 | 7.52 |
| Example 15 | 7.20 | 6.89 |
| Example 16 | 6.95 | 6.68 |
| Comparative Example 1 | 4.28 | 3.01 |
| Comparative Example 2 | 5.01 | 4.23 |
| Comparative Example 3 | 3.69 | 1.65 |
| Comparative Example 4 | 2.56 | 1.16 |

EXPERIMENTAL EXAMPLE 4

In order to compare and illustrate the flame resistance of the modified WPU composite materials of the examples and comparative examples of the present disclosure, the flame resistance of the materials of Examples 8 to 16 and Comparative Examples 1 to 4 was tested with reference to the ASTM D2863-77 standard, and test results are shown in Table 5.

TABLE 5

Flame resistance test results of different WPU materials

| Example No. | LOI |
|---|---|
| Example 8 | 24% |
| Example 9 | 20% |
| Example 10 | 21% |
| Example 11 | 22% |
| Example 12 | 20% |
| Example 13 | 19% |
| Example 14 | 23% |
| Example 15 | 22% |
| Example 16 | 21% |
| Comparative Example 1 | 19% |
| Comparative Example 2 | 20% |
| Comparative Example 3 | 19% |
| Comparative Example 4 | 18% |

According to the above test results, compared with the composite material introduced with an unmodified collagen fiber, the tensile strength of the composite material of the present disclosure is increased by about 66.5%, the water vapor permeability is increased by about 55.4%, the aging resistance is significantly improved, and the change rate in tensile strength before and after light exposure is reduced by about 82.3%; compared with the composite material with the aziridine cross-linking agent, the tensile strength of the composite material of the present disclosure is increased by about 225.8%, the water vapor permeability is increased by about 128.3%, the aging resistance is significantly improved, and the change rate in tensile strength before and after light exposure is reduced by about 94.9%; compared with the composite material prepared from the modified collagen fiber with a pH of 4, the tensile strength of the composite material prepared from the modified collagen fiber with a pH adjusted to 6.5 to 7 is increased by about 126.1%, the water vapor permeability is increased by about 90.1%, the aging resistance is significantly improved, and the change rate in tensile strength before and after light exposure is reduced by about 95.0%. It indicates that, when the tannin, the collagen fiber, and the WPU have an appropriate mass ratio, the modified WPU composite material obtained by mixing the modified collagen fiber and the WPU according to the present disclosure shows significantly-improved mechanical properties, water vapor permeability, aging resistance, and flame resistance.

Finally, it should be noted that the above examples are merely intended to describe the technical solutions of the present disclosure, rather than to limit the present disclosure. Although the present disclosure is described in detail with reference to the above examples, persons of ordinary skill in the art should understand that modifications may be made to the technical solutions described in the above examples or equivalent replacements may be made to some or all technical features thereof, which do not make the essence of corresponding technical solutions depart from the scope of the technical solutions in the examples of the present disclosure.

What is claimed is:

1. A modified waterborne resin composite material, wherein the modified waterborne resin composite material is prepared by a modified collagen fiber and a waterborne resin; wherein the waterborne resin comprises at least one selected from the group consisting of a waterborne polyurethane (WPU) resin, a waterborne polyester resin, a waterborne epoxy resin, and a waterborne acrylic resin;
wherein a method for preparing the modified collagen fiber comprises the following steps:
mixing an aqueous solution of a tanning agent with an aqueous dispersion of a collagen fiber in a liquid environment and adjusting a pH to 5 to 8 with an alkali to allow a reaction, and washing and drying a product, wherein the tanning agent consists of plant tannin, wherein the collagen fiber is prepared through pretreatment of leather shavings, and wherein the pretreatment comprises dewatering and crushing the leather shavings.

2. The modified waterborne resin composite material according to claim 1, wherein the plant tannin and the collagen fiber are mixed in the liquid environment with a pH of 6.5 to 7 to allow the reaction.

3. The modified waterborne resin composite material according to claim 1, wherein the plant tannin is a condensed tannin or a mixed tannin.

4. The modified waterborne resin composite material according to claim 1, wherein the plant tannin comprises at least one selected from the group consisting of bayberry tannin, black wattle tannin, larch tannin, *quebracho* tannin, and *Acacia mangium* (*A. mangium*) tannin.

5. The modified waterborne resin composite material according to claim 4, wherein the plant tannin is bayberry tannin.

6. The modified waterborne resin composite material according to claim 1, wherein a mass ratio of the plant tannin to the collagen fiber is 1:(1-10).

7. The modified waterborne resin composite material according to claim 6, wherein the mass ratio of the plant tannin to the collagen fiber is 1:(2-5).

8. The modified waterborne resin composite material according to claim 6, wherein the mass ratio of the plant tannin to the collagen fiber is 1:(3-4).

9. The modified waterborne resin composite material according to claim 1, wherein the aqueous solution of the plant tannin is added to the aqueous dispersion of the collagen fiber for mixing.

10. The modified waterborne resin composite material according to claim 9, wherein the reaction is conducted for 1 hour to 10 hours.

11. The modified waterborne resin composite material according to claim 10, wherein the reaction is conducted for 2 hours to 8 hours.

12. The modified waterborne resin composite material according to claim 1, wherein the drying is conducted at 30° C. to 90° C. for 16 hours to 30 hours; and a method for the drying comprises one selected from the group consisting of natural air-curing, heat-drying, and vacuum-drying.

13. The modified waterborne resin composite material according to claim 12, wherein the drying is conducted at 60° C. to 85° C. for 18 hours to 26 hours.

14. The modified waterborne resin composite material according to claim 12, wherein the drying is conducted at 80±2° C. for 24±2 hours.

15. The modified waterborne resin composite material according to claim 1, wherein the leather shavings comprise metal-tanned leather shavings.

16. The modified waterborne resin composite material according to claim 1, wherein the leather shavings comprise blue leather shavings.

17. The modified waterborne resin composite material according to claim 1, wherein a method of the dewatering comprises at least one selected from the group consisting of natural air-curing, heat-drying, ethanol dewatering, lyophilization, and vacuum-drying.

18. The modified waterborne resin composite material according to claim 1, wherein a method of the dewatering comprises ethanol dewatering, lyophilization, and vacuum-drying.

19. The modified waterborne resin composite material according to claim 1, wherein the waterborne resin comprises at least one selected from the group consisting of the WPU resin, the waterborne polyester resin, and the waterborne acrylic resin.

20. The modified waterborne resin composite material according to claim 1, wherein the waterborne resin is the WPU resin.

21. The modified waterborne resin composite material according to claim 19, wherein a mass ratio of the modified collagen fiber to the waterborne resin is 1:(1-5).

22. The modified waterborne resin composite material according to claim 21, wherein the mass ratio of the modified collagen fiber to the waterborne resin is 1:(1.5-4).

23. The modified waterborne resin composite material according to claim 21, wherein the mass ratio of the modified collagen fiber to the waterborne resin is 1:(2-3).

24. A preparation method of the modified waterborne resin composite material according to claim 1, comprising the following steps:
blending the modified collagen fiber and the waterborne resin, and molding a blended material.

25. The preparation method of the modified waterborne resin composite material according to claim 24, wherein the step of blending is conducted as follows: stirring a mixture of the modified collagen fiber and the waterborne resin for 30 min to 40 min at a stirring rate of 500 r/min to 3,000 r/min.

26. The preparation method of the modified waterborne resin composite material according to claim 24, wherein the step of molding is conducted as follows: placing the blended material in a mold, and drying at 90° C. to 120° C.

27. The preparation method of the modified waterborne resin composite material according to claim 24, wherein the step of molding is conducted by a hand laying-up technique.

28. The preparation method of the modified waterborne resin composite material according to claim 24, wherein the step of molding is conducted as follows: using a hand laying-up technique to coat the blended material on a surface of a base cloth or release paper with a roll coater, and drying at 90° C. to 120° C.

* * * * *

UNITED STATES PATENT AND TRADEMARK OFFICE
CERTIFICATE OF CORRECTION

PATENT NO. : 11,674,007 B2  
APPLICATION NO. : 17/739080  
DATED : June 13, 2023  
INVENTOR(S) : Shuangyang Li et al.

Page 1 of 1

It is certified that error appears in the above-identified patent and that said Letters Patent is hereby corrected as shown below:

On the Title Page

The Foreign Application Priority Data should be added as:  
Sept. 18, 2020 (CN) 202010985238.X Signed and Sealed this  
Fifteenth Day of August, 2023

Katherine Kelly Vidal  
*Director of the United States Patent and Trademark Office*